(No Model.)
R. CLEARY.
COMBINED HARROW AND PULVERIZER.
No. 336,794. Patented Feb. 23, 1886.
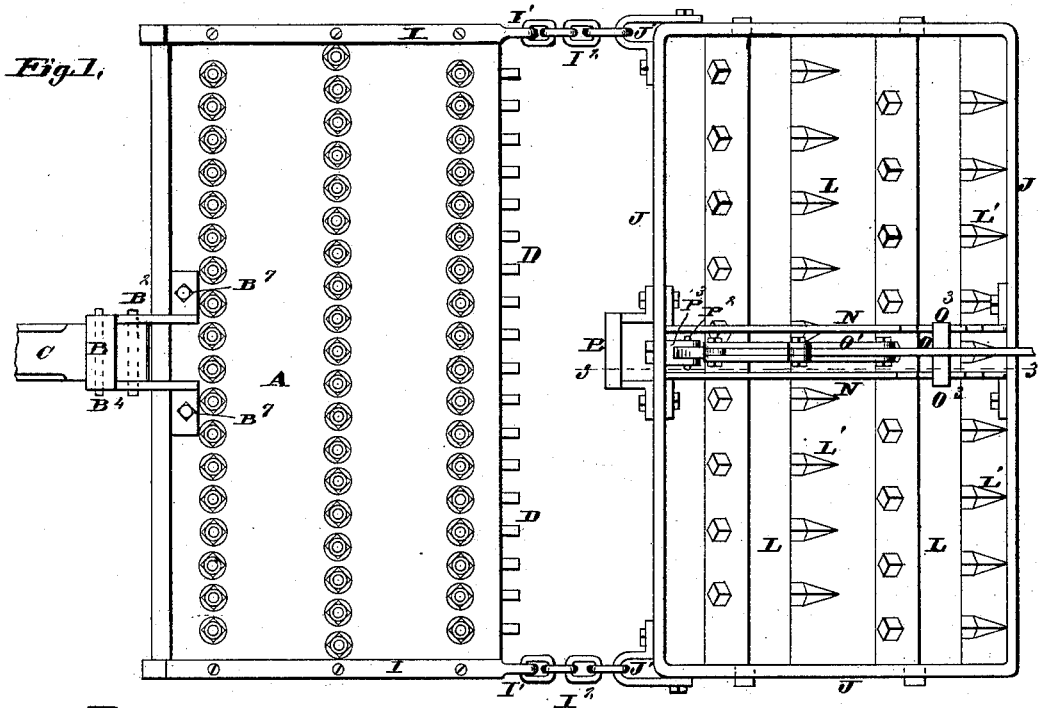
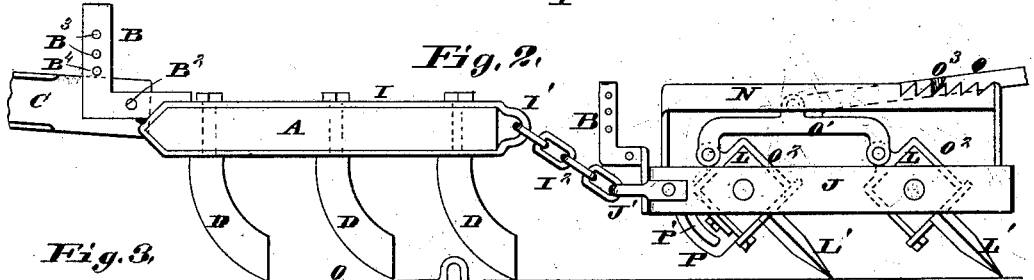
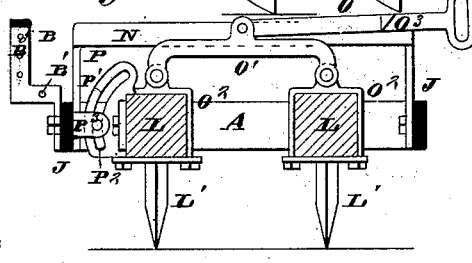
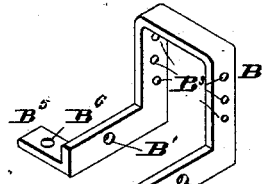
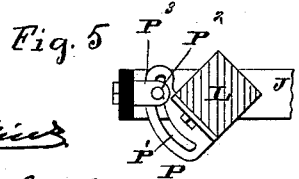
Attest:
L. W. Hopkins
Geo. L. Wheelock
Inventor:
Richard Cleary
By Knight Bros
Att'ys

UNITED STATES PATENT OFFICE.

RICHARD CLEARY, OF ST. CHARLES, MISSOURI.

COMBINED HARROW AND PULVERIZER.

SPECIFICATION forming part of Letters Patent No. 336,794, dated February 23, 1886.

Application filed March 30, 1885. Serial No. 160,615. (No model.)

*To all whom it may concern:*

Be it known that I, RICHARD CLEARY, of St. Charles, in the county of St. Charles and State of Missouri, have invented a certain new and useful Improvement in a Combined Harrow and Pulverizer, of which the following is a full, clear, and exact description, reference being had to the accompanying drawings, forming part of this specification, and in which—

Figure 1 is a top view of my improved pulverizer and harrow. Fig. 2 is a side elevation of same. Fig. 3 is a vertical transverse section of the harrow part of the apparatus, taken on line 3 3, Fig. 1. Fig. 4 is a perspective view of the tongue-clip removed, and Fig. 5 is a detail view.

My invention relates to certain improvements in combined pulverizers and harrows; and my invention consists in features of novelty hereinafter fully described, and pointed out in the claims.

Referring to the drawings, A represents the frame of the pulverizer, to which is secured a clip or bracket, B, for the attachment of the tongue C, when one is used. The clip has holes $B'$ to receive a pin, $B^2$, that passes through the tongue, and it has holes $B^3$, to receive a pin, $B^4$, that fits above the tongue, and by raising this pin from a lower to a higher set of holes the outer end of the tongue is free to rise higher without lifting the front part of the pulverizer. The clip has laterally-projecting lugs $B^5$, with holes or perforations $B^6$, to receive bolts $B^7$, by which the clip is secured to the frame A.

D represents the knives or cutters of the pulverizer, that are curved backward, as shown in Fig. 2, and act to slice and cut the lumps and loosen the ground in general. The frame A has side straps, I, having at the back of the pulverizer eyes $I'$, to receive chains $I^2$, the other ends of which fit in clips $J'$, secured to the front part of the frame J of the harrow, and thus the two parts of the apparatus are connected together.

L represents two or more beams journaled in the frame J, and in them are secured the teeth $L'$ of the harrow. They are capable of being rocked, so as to present the teeth in a vertical or a rearwardly-inclined position, as shown in Figs. 3 and 2, and the inclination may be greater or less, the beams being held to any adjustment by ratchet-bars N, secured to the frame J, and a bar, O, hinged to a yoke, $O'$, connected to the beams by straps $O^2$. The bar or handle O has projections $O^3$, that fit in the teeth of the ratchet-bars. By pulling back on the handle the beams are rocked to decrease the inclination of the teeth—that is, it will bring them nearer a vertical position, and by pushing the bar forward (toward the front of the harrow) the inclination of the teeth will be increased. The front beam is strengthened and kept rigid in the center by a bracket, P, thereon, having a curved slot, $P'$, in which fits a pin, $P^2$, secured to the frame J by a block, $P^3$. The harrow part could be used by itself, and would then be provided with a clip, B, for the attachment of a tongue.

I claim as my invention—

1. The combination, with a frame and tongue, of the clip B, having lugs $B^5$, formed with bolt-holes $B^6$ and holes $B'$ and $B^3$, bolts by which the lugs are secured to said frame, and pins $B^2$ and $B^4$ by which said tongue is secured to said clip, substantially as set forth.

2. The combination of a frame, beams having teeth and pivoted to said frame, ratchet-bars immovably secured to said frame above said beams, a yoke hinged to said beams beneath the ratchet-bars above the frame, and a handle hinged to said yoke, passing upwardly between the ratchet-bars, and provided with projections engaging the teeth of the bars, for holding said beams in desired position, substantially as set forth.

3. The combination, with a pivoted beam having teeth, of the yoke, ratchet-bars, handle having projections, supporting-frame having a block provided with a pin, and pivoted beam provided with a bracket having a curved slot occupied by said pin, substantially as set forth.

4. In combination with the beams provided with teeth, ratchet-bars secured to the frame of the harrow, a bar or handle connected to the beams by yoke and straps, and having projections fitting in the notches of the ratchet-bars, bracket P, secured to the front beam and having a semicircular slot, $P'$, and the block $P^3$, having a pin, $P^2$, fitting in the slot in the bracket, all arranged and operating substantially as shown and described, for the purpose set forth.

RICHARD CLEARY.

In presence of—
FR. BORGMEYER,
C. W. WILSON.